(12) United States Patent
Eslambolchi et al.

(10) Patent No.: US 6,169,517 B1
(45) Date of Patent: Jan. 2, 2001

(54) TECHNIQUE FOR SCREENING WORK REQUESTS

(75) Inventors: Hossein Eslambolchi, Basking Ridge, NJ (US); John Sinclair Huffman, Conyers, GA (US); Frank Ianna, Bergen, NJ (US)

(73) Assignee: AT&T Corp., New York, NY (US)

( * ) Notice: Under 35 U.S.C. 154(b), the term of this patent shall be extended for 0 days.

(21) Appl. No.: 09/288,367

(22) Filed: Apr. 8, 1999

Related U.S. Application Data

(63) Continuation-in-part of application No. 09/239,931, filed on Jan. 29, 1999, now abandoned.

(51) Int. Cl.$^7$ ................................ H04B 7/185; G01S 5/02
(52) U.S. Cl. ...................................... 342/357.13; 701/208
(58) Field of Search ........................ 342/357.13; 701/208

Primary Examiner—Theodore M. Blum
(74) Attorney, Agent, or Firm—Robert B. Levy

(57) ABSTRACT

An entity (18) that maintains facilities, such as buried conveyances (12) screens requests by contractors to undertake work that may potentially impact such facilities by comparing the Global Satellite Positioning (GPS) coordinates associated with the location of the work to the GPS coordinates of each facility. In the event that the work will occur within a minimum separation distance from the facility, then the entity maintaining the facility will dispatch a technician to physically locate and mark the facility.

11 Claims, 3 Drawing Sheets

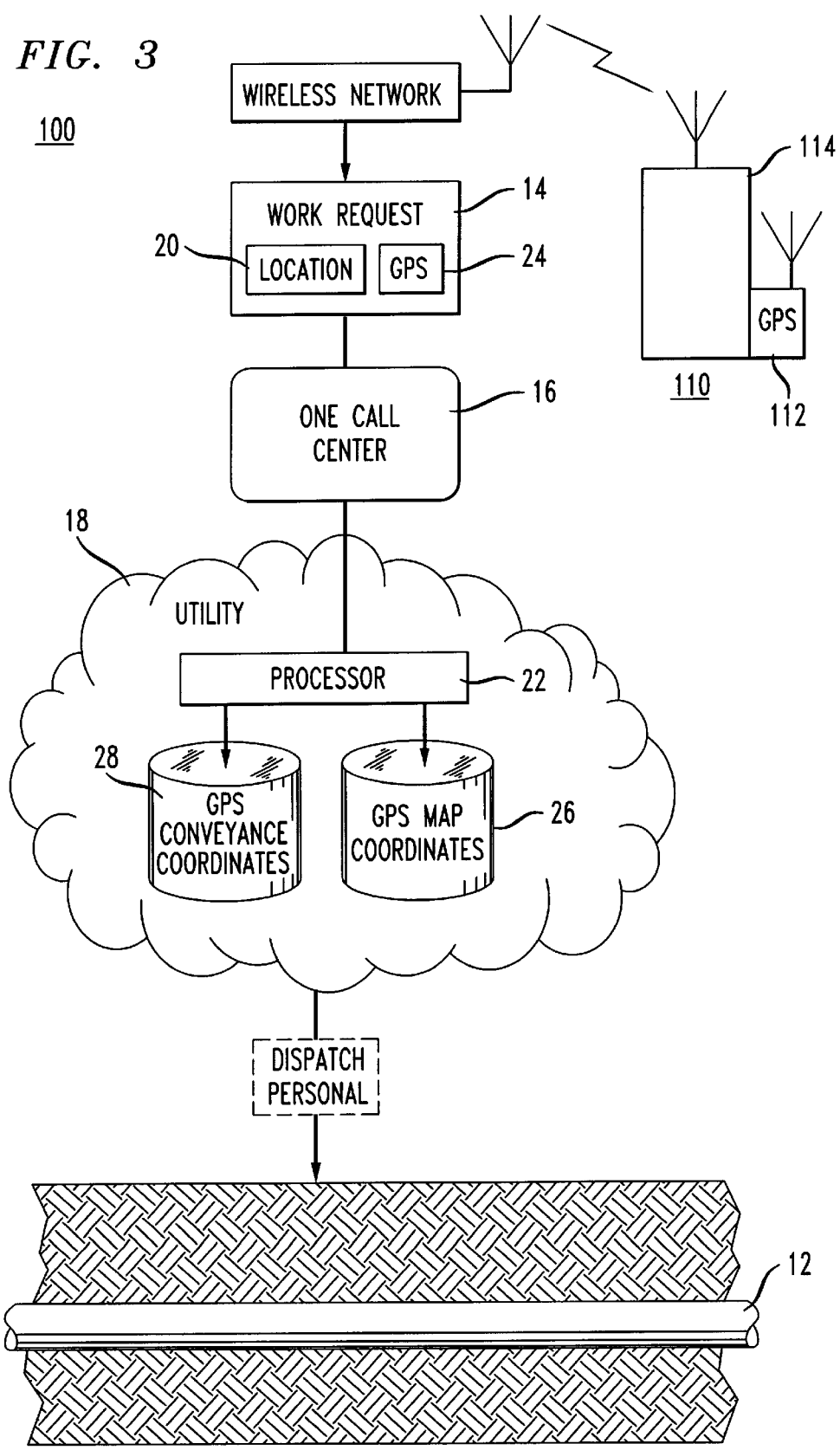

TECHNIQUE FOR SCREENING WORK REQUESTS

RELATED APPLICATION

This application is a continuation-in-part of U.S. application Ser. No. 09/239,931 filed Jan. 29, 1999, now abandoned.

TECHNICAL FIELD

This invention relates to a technique for enabling an entity to screen a request for work to determine whether work will occur at a site is sufficiently close in proximity to the location of one of the entity's facilities such that the work may damage the facility.

BACKGROUND ART

Most utilities, such as those that provide electric, water, gas or telephone service, bury their conveyances (i.e., pipes and cables) underground both for reasons of safety and esthetics. For example, AT&T as a provider of telecommunications services, maintains a network of some 50,000 miles of buried optical fiber cable installed in a variety of environments. AT&T's network of buried optical fiber runs under city streets, rural farmland, and along other public and private rights of way. Although burial does protect such optical fiber cables from the elements, such buried cables, as well as other underground conveyances, do remain vulnerable to damage from excavation by contractors.

In many areas, governmental regulations require that contractors seeking to excavate first contact a central agency, often referred to as a "One-Call Center," prior to undertaking excavation. Personnel at the center forward such contractor work requests to those entities that maintain buried cables within the region served by the center. Each entity screens the work request to determine whether the work anticipated by the contractor will actually occur sufficiently close to that entity's underground conveyances to require dispatching personnel to physically locate and mark such buried conveyances. Each year, One-Call Centers in the United States process numerous requests, so an entity that maintains buried conveyances must devote significant personnel and resources to perform the location and marking of buried conveyances.

Some One-Call Centers do a better job of screening work requests than others. For example, some centers will report work requests with out regard to boundaries, while others will screen works requests within boundaries, thus avoiding sending such requests to entities that lack buried conveyances within the specified boundary. However, even screening of work requests based on a specified boundary has its limits. Often the boundary specified in the work request may lack sufficient accuracy for an entity that maintains buried conveyances to rely on a general comparison between the specified boundary data and the entity's own conveyance location records for screening purposes. For this reason, most entities that maintain buried conveyances, such as AT&T, often take a "better safe than sorry" attitude and usually dispatch technicians to mark and locate, even though making and locating may not have been necessary.

Thus, there is a need for a technique for more accurately screening work requests.

BRIEF SUMMARY OF THE INVENTION

Briefly, the present invention provides a method for use by an entity, such as a utility or the like, that maintains facilities, such as buried conveyances, to screen work requests such as from contractors seeking to perform work in close proximity to a facility to determine whether the work may cause damage to such facility. In accordance with the invention, the entity first receives a work request that identifies the site at which the work will occur. Thereafter, the entity receiving the work request establishes the Global Positioning Satellite (GPS) coordinates corresponding to site where the work will occur. In some instances, the work request will include the GPS coordinates of the work site so the entity receiving the work request need only read the GPS coordinates from the request. For example, a contractor may make the work request with the aid of a special wireless telephone that includes an integral GPS receiver that automatically provides the GPS coordinates to the screening entity. When the GPS coordinates are not present in the work request, the entity will establish the GPS coordinates, either from a map, or a database that such coordinates for different locations. Once the GPS coordinates corresponding to the work site are established, then the GPS work site coordinates are compared to the GPS coordinates of each facility to determine whether the work site is sufficiently close to a facility to warrant concern.

BRIEF SUMMARY OF THE DRAWINGS

FIG. 3 shows an alternate preferred embodiment of the apparatus of FIG. 1 for screening work requests in accordance with the invention.

DETAILED DESCRIPTION

Figure 1:
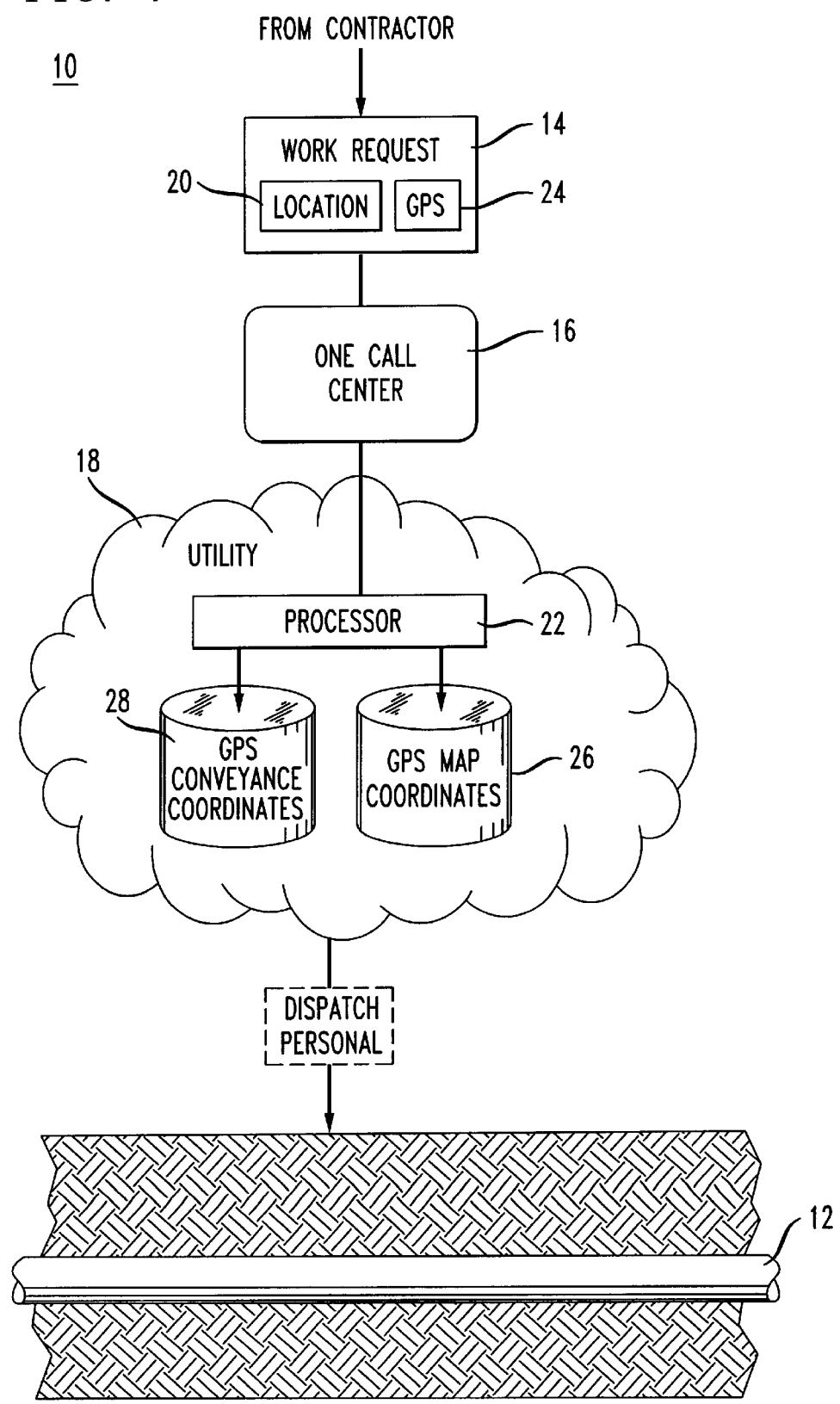
FIG. 1 shows a block schematic diagram of an apparatus for screening work requests in accordance with the invention.

Referring to FIG. 1, a contractor seeking to perform work (e.g., excavation) at a work site 10 that may encompass one or more buried conveyances 12 (only one of which is shown) generally must first submit a work request 14 to a One-Call Center 16. The One-Call center 16 screens each work request 14 to determine whether to notify the various utilities 18 (only one shown) who may maintain buried conveyances, such as buried conveyance 12, in the region 10 where work is to occur.

Each work request 14 contains location information 20 specifying site where the where the work will occur. Traditionally, the One-Call Center 16 examined the location information 20 to determine whether a utility, such as utility 18, had one or more buried conveyances within the boundary of the work site whose location is specified by the location information 20. If the One-Call Center 16 determined from its records that the utility 18 had a conveyance, such as conveyance 12, within the boundary of the work site, the One-Call center passed the work request 14 to the utility. In response, the utility would dispatch personnel to the work site to physically locate and mark the conveyance 12 depending on the utility's policy required separation distance between the conveyance and the work site boundary.

Unfortunately, not all One-Call Centers provide good location-boundary screening of the type described above. Some centers simply pass all work requests directly to each utility, forcing the each utility to perform its own screening. Such screening is time consuming, and increases operating costs.

In accordance with the invention, a utility, such as utility 18, can achieve more accurate screening of work requests by comparing the corresponding Global Positioning Satellite (GPS) coordinates for the work site against the GPS coordinates of the buried conveyances maintained by the utility. To accomplish such screening, the utility 18 maintains at least one processor 22, in the form of a personal computer or the like into which the data contained in each work request 14 is entered following receipt of the work request from the One-Call Center 16. For each received work request 14, the processor 22 establishes the GPS coordinates of the site where the work will occur. In some instances, the work request 14 will include a data block 24 containing the work site GPS coordinates, in which case, the processor simply establishes the GPS work site coordinates from the data block 24 on the work request 14. However, the work request 14 may not include the GPS coordinates of the work site location. In other words, the data block 24 may be devoid of any data. Under such circumstances, the processor 22 queries a database 26 that maps locations to a corresponding set of GPS coordinates. In this way, the processor 22 can establish the GPS coordinates for a work site though the associated work request contains no such coordinates.

In addition to the database 26, the processor 22 also has access to a database 28 that stores the GPS coordinates for the buried conveyances maintained by the utility. A technique for capturing the GPS coordinates during installation of a buried conveyance, such as an optical fiber, is described and claimed in U.S. patent application Ser. No. 09/089,827, filed on Jun. 3, 1998, in the name of Hossein Eslambolchi and John S. Huffman, and assigned to AT&T (incorporated by reference herein). The GPS location coordinates captured in accordance with the teachings of the '827 application can be supplied to the database 28 in a variety of ways, such as by direct electronic transfer of data, or via a magnetic or optical medium. By querying the database 28, the processor 22 can compare the GPS coordinates of each of its buried conveyances, such as conveyance 12, to the GPS coordinates established for the work site and determine whether the work site is within a minimum distance as to require dispatching technicians to physically locate and mark the conveyance.

Figure 2:
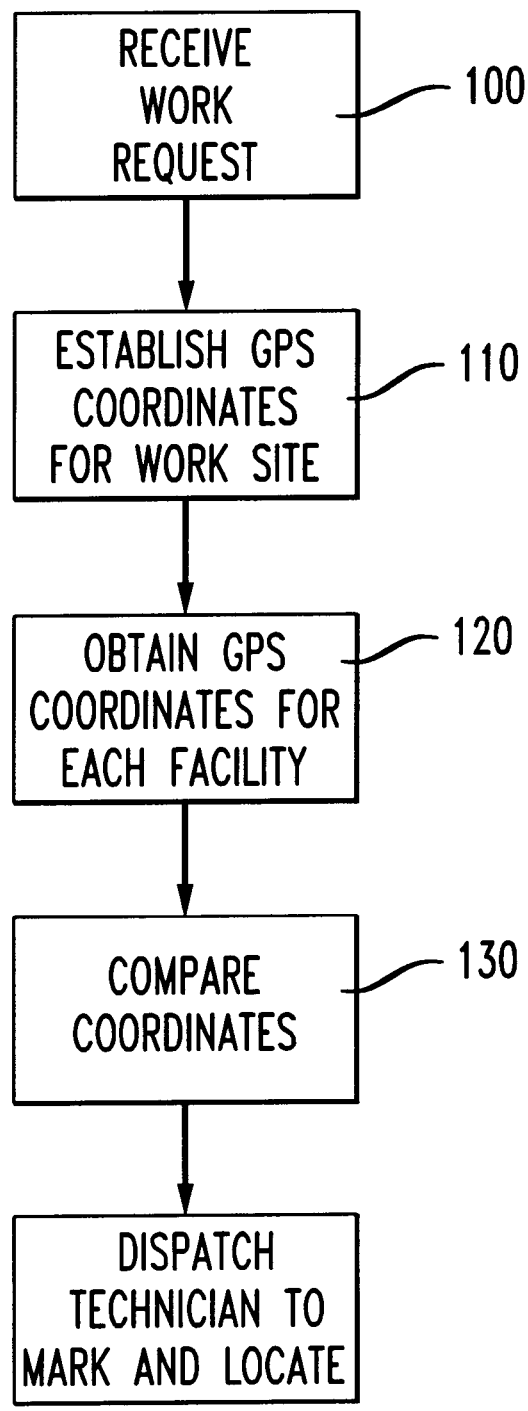
FIG. 2 shows a flow chart diagram of the steps associated with screening work requests in accordance with the invention.

FIG. 2 depicts in flow chart form the steps executed by the processor 22 of FIG. 1 to screen each work request 14 of FIG. 1. Initially, the processor 22 receives the work request 14 (step 100) and thereafter establishes the GPS coordinates for the work site (step 110). As described above, the processor 22 establishes the GPS work site coordinates simply reading them from the work request 14 if the coordinates are present in the data block 24 of FIG. 1. Otherwise, the processor 22 must query the database 26 to map the work site location to a corresponding set of GPS coordinates.

After the processor 22 establishes the GPS coordinates for the work site, then the processor obtains the GPS coordinates for each buried conveyance, such as conveyance 12 by querying the database 28 (step 120). Typically, the database 28 contains the GPS coordinates of buried conveyances maintained by the utility 18. However, to the extent that work requests could impact facilities of the utility 18 other than buried conveyances, the utility would store the GPS coordinates of such facilities in the database 28.

Once the processor 22 has obtained the GPS coordinates for its facilities, then the processor makes a comparison between the GPS work site coordinates and the GPS facility coordinates (step 130) to determine whether any facility, such as buried conveyance 12, lies within a minimum distance from the work site. If a facility lies within the minimum distance, then a technician is dispatched to physically locate and mark the conveyance (step 140). Typically, such locating is accomplished by electromagnetic signaling. If no facility lies within the work site, then the processor so advises the One-call center 16.

FIG. 3 shows an alternate preferred embodiment 100 of the apparatus for screening work requests in accordance with the invention. The apparatus 100 of FIG. 3 includes many of the same elements as the apparatus of FIG. 1 and like reference numbers are used to describe like elements. The apparatus of FIG. 3 includes a combined wireless telephone/GPS receiver 110 for use by a contractor in making the work request 14 to the one-call center 16. The combined wireless telephone/GPS receiver 110 includes a GPS receiver portion 112 that operates to receive GPS satellite information to establish the GPS coordinates of its location similar to-a conventional GPS receiver. The GPS receiver portion 112 provides the GPS location information to a wireless transceiver portion 114 for broadcast thereby to a wireless network 116 which carries the call made by the combined wireless telephone/GPS receiver 110 to the one call center 16.

The advantage achieved by having a contractor utilize the combined wireless telephone/GPS receiver 110 to communicate the work request 14 to the one-call center 16 is that the combined wireless telephone/GPS receiver automatically provides the GPS coordinates 24. Otherwise, the contractor would need to make the measurement separately, or simply omit this information, requiring that the utility 18 establish the coordinates in the manner described with respect to FIG. 1. Having the contractor use the combined wireless telephone/GPS receiver 110 to communicate the work request 14, and thus automatically provide the GPS coordinates 24 will greatly simply improve the accuracy of the screening process.

The foregoing describes a technique for screening work requests by comparing the GPS coordinates of the work site to the GPS coordinate of each of a set of facilities to determine if any facility lies within a minimum distance from the work site to warrant physical location and marking of the facility The above-described embodiments merely illustrate the principles of the invention. Those skilled in the art may make various modifications and changes that will embody the principles of the invention and fall within the spirit and scope thereof.

What is claimed is:

1. A method for use by a party that maintains various facilities at different locations to screen a request for work to occur at a geographic site to determine whether said site is sufficiently close in proximity to the location of one of said various facilities such that said work may damage said one facility, comprising the steps of:

receiving said work request identifying what work is to occur and said geographic site where such work is to occur;

establishing for said received work request a set of Global Positioning Satellite (GPS) coordinates that identify the geographic site where said work is to occur;

querying a first database containing facility records that each contain a set of GPS coordinates that identify the location of each said facility; and comparing the GPS coordinates established for said work request to the GPS coordinates for each facility to determine whether any of said facilities is sufficiently close in proximity such that work to occur may damage said any facility.

2. The method according to claim 1 wherein the method includes the steps of:

dispatching personnel to said any facility that is sufficient close in proximity to said work; and physically locating and marking said any facility.

3. The method according to claim 2 wherein said facilities comprise buried conveyances and wherein said any facility is physically located by electromagnetic signaling.

4. The method according to claim 1 wherein the step of establishing the set of GPS coordinates for each work request includes the steps of:

determining whether said work request specifies a set of GPS coordinates for said geographic site where such work is to occur, and, if no such coordinates are specified, then identifying, from the location of the geographic site where said work is to occur, the GPS coordinates corresponding to said geographic site.

5. The method according to claim 4 wherein the identifying step includes the step of:

querying a second database containing GPS coordinates for potential work sites to establish the GPS coordinates for said geographic site.

6. The method according to claim 1 wherein said work request contains GPS coordinates for said geographic site where said work will occur and wherein the establishing step includes the step of obtaining said GPS coordinates from said work request.

7. The method according to claim 1 further including the step of providing an indication when no facility lies within a predetermined distance from the work site.

8. The method according to claim 1 wherein the step of establishing the Global Positioning Satellite coordinates includes the steps of:

determining the Global Positioning Satellite coordinates via a combined wireless telephone and Global Positioning Satellite receiver;

automatically communicating the Global Positioning Satellite coordinates along with the work request via a wireless communication.

9. A method for use by a party that maintains various facilities at different locations to screen a request for work to occur at a geographic site to determine whether said site is sufficiently close in proximity to the location of one of said various facilities such that said work may damage said one facility, comprising the steps of:

receiving via a wireless communication said work request identifying what work is to occur and said geographic site where such work is to occur along with a set of Global Positioning Satellite (GPS) coordinates that identify the geographic site where said work is to occur;

querying a first database containing facility records that each contain a set of GPS coordinates that identify the location of each said facility; and comparing the GPS coordinates associated with said work request to the GPS coordinates for each facility to determine whether any of said facilities is sufficiently close in proximity such that work to occur may damage said any facility.

10. The method according to claim 9 wherein the method includes the steps of:

dispatching personnel to said any facility that is sufficient close in proximity to said work; and physically locating and marking said any facility.

11. The method according to claim 10 wherein said facilities comprise buried conveyances and wherein said any facility is physically located by electromagnetic signaling.

* * * * *